United States Patent [19]

Nishimura et al.

[11] Patent Number: 5,198,026
[45] Date of Patent: Mar. 30, 1993

[54] COLORED ZINC POWDER, ITS METHOD OF PRODUCTION AND METHOD FOR PRODUCING COLORED ARTICLE

[75] Inventors: Eiji Nishimura, Saitama; Chikara Tominaga, Kanagawa; Yusaku Masuda, Toyama; Hiroshi Tasaki, Saitama, all of Japan

[73] Assignee: Nippon Mining Co., Ltd., Tokyo, Japan

[21] Appl. No.: 765,410

[22] Filed: Sep. 25, 1991

[30] Foreign Application Priority Data

Apr. 27, 1989 [JP] Japan ................................. 1-105819
Aug. 10, 1990 [JP] Japan ................................. 2-210282

[51] Int. Cl.$^5$ ........................... C09C 1/04; C09C 1/62; C04B 14/34
[52] U.S. Cl. ..................... 106/430; 106/419; 106/425; 106/426; 106/427; 106/428; 106/431; 75/333; 427/216; 427/228; 427/422; 427/455
[58] Field of Search ............... 106/419, 425, 426, 427, 106/428, 430, 431; 427/216, 228, 422, 423; 75/333; 117/103

[56] References Cited

U.S. PATENT DOCUMENTS

| 3,630,792 | 12/1971 | Smyth et al. | 148/6.3 |
| 4,267,211 | 5/1981 | Yajima et al. | 427/228 |
| 4,394,332 | 6/1983 | Raman et al. | 75/333 |
| 4,447,466 | 5/1984 | Jackson et al. | 427/423 |
| 4,657,787 | 4/1987 | Singer et al. | 427/422 |
| 4,820,552 | 4/1989 | Espinosa-c et al. | 427/216 |
| 4,915,906 | 4/1990 | Champagne et al. | 427/422 |

FOREIGN PATENT DOCUMENTS

| 885955 | 11/1971 | Canada | 117/103 |
| 0089608 | 9/1983 | European Pat. Off. | |
| 0269005 | 1/1988 | European Pat. Off. | |
| 0269006 | 1/1988 | European Pat. Off. | |
| 708346 | 7/1931 | France | |
| 1195904 | 8/1966 | United Kingdom | |

OTHER PUBLICATIONS

Patent Abstracts of Japan, vol. 12, No. 387 (C-526) [3234], Oct. 14, 1988; & JP-A-63 130756 (Nikko Aen) Jun. 2, 1988.
Patent Abstracts of Japan, vol. 9, No. 324 (C-320) [2047], Dec. 19, 1985; & JP-A-60 155 660 (Kawasaki Seitetsu) Aug. 15, 1985).
Chemical Abstracts, vol. 103, No. 5, Sep. 1985, p. 215, abstract no. 74632z, Columbus, Ohio US; & ES-A-506809 (Compania Espanola Para La Fabricacion De Acero Inoxidable S.A.) Oct. 16, 1983.
Chemical Abstracts, vol. 100, No. 18, Apr. 1984, p. 251, abstract no. 143281m, Columbus, Ohio, US; & JP-A-58 171560 (Nisshin Steel Co., Ltd.) Oct. 8, 1983.

Primary Examiner—William R. Dixon, Jr.
Assistant Examiner—Scott L. Hertzog
Attorney, Agent, or Firm—Armstrong & Kubovcik

[57] ABSTRACT

Zinc powder, which contains a coloring element, e.g., Ti, Mn, or V, is heated to a temperature of from 350° to 700° C. so as to oxidize the surface of the powder and hence to develop such colors as brown, navy blue, blue, greenish-brown, green, and coffee brown. The colored zinc powder is sprayed onto a steel, aluminum, or ceramic article to produce a colored article. The colored zinc powder is also used as a pigment.

17 Claims, 2 Drawing Sheets

COLORED ZINC POWDER, ITS METHOD OF PRODUCTION AND METHOD FOR PRODUCING COLORED ARTICLE

This is a continuation of application 07/599,548, filed Oct. 18, 1990, now abandoned, which is a continuation-in-part application U.S. Ser. No. 515,014.

BACKGROUND OF INVENTION

1. Field of Invention

The present invention relates to colored zinc powder, and a method for producing the colored zinc powder. The present invention also relates to the coloring of an article.

2. Description of Related Arts

A technique for color development is described in Japanese Unexamined Patent Publication No. 60-129,788. That is, steel or the like is hot-dip galvanized in a zinc bath which contains Ti, V or Mn, and is then heated so as to develop the color.

However, colored zinc powder or colored zinc-alloy powder on which the color is developed, is heretofore unknown.

The color developing method by hot-dip galvanizing is applied to basic materials such as a steel sheet, a steel pipe, and the like, but it is difficult to apply it to materials which are already assembled into final products. In addition, the color developing method by hot-dip galvanizing is difficult to apply locally on portions of the material. There are, in addition, such drawbacks as: color development of dark brown is difficult; the throwing power of melt by the plating bath on a steel product having a curved surface is too weak to provide uniform development of color; and application to metals other than iron is difficult.

SUMMARY OF THE INVENTION

It is an object of the present invention to provide a colored zinc powder which does not incur the above described drawbacks and which can be broadly applied to articles and materials having various configurations.

It is another object of the present invention to provide a method for producing the colored zinc powder.

It is a further object of the present invention to provide a method for producing an article colored by the colored zinc powder.

In accordance with the objects of the present invention, there is provided a colored zinc powder having a colored surface, which powder contains a coloring element and has a colored oxide layer on the surface thereof.

The colored oxide layer is formed by oxidizing the zinc powder containing the coloring element at a temperature in a range of from 350° to 700° C.

A preferred coloring element is one or more elements selected from a group consisting of Ti, Mn, and V and is contained in an amount of from 0.01 to 10.0% by weight. The balance of the coloring element is 1.5% by weight or less in total of Pb, Cd and Fe, and 88.5% by weight or more of Zn.

In accordance with the objects of the present invention, there is provided a method for producing a colored zinc powder comprising the following steps:

preparing a zinc powder containing a coloring element; and oxidizing the zinc powder on its surface at a temperature in a range of from 350° to 700° C.

In accordance with the objects of the present invention, there is also provided a method for producing a colored article by spraying the colored zinc powder on a substrate or bonding the colored zinc particles on a substrate having an adhesive surface.

DESCRIPTION OF THE PREFERRED EMBODIMENTS

The zinc of the colored zinc powder according to the present invention contains the additive elements, i.e., the coloring elements, described below. The additive elements are added to distilled zinc metal (grade 1, purity 98.5% or more) and the purest zinc metal (purity 99.995%) stipulated in JIS H 2107, and zinc metal for electric purpose (purity 99.9% or more). The additive elements are Ti, Mn, V, and the like and are added in an amount of from 0.01 to 10% by weight, Pb in an amount of 1.5% by weight or less, Cd in an amount of 0.1% by weight or less and Fe in an amount of 0.02% or less are contained in the distilled zinc metal (grade 1) as impurities. The content of the impurities is 0.005% by weight or less in the case of the purest zinc metal and zinc metal for electric purposes. The total content of the impurities is preferably 1.5% by weight or less from the viewpoint of color development.

The surface of the zinc-alloy powder with the additive elements described above is oxidized so as to develop color. The color development is attributable to interference of the light on the oxide film.

The size of the colored zinc powder according to the present invention can be optionally selected, and the color development is possible in a broad range of from 5 μm to 10 mm of the powder size.

A preferable size of the colored zinc powder for spraying is from 40 to 100 μm. A Preferable size of the colored zinc powder for use as pigment is from 10 to 30 μm.

The colored zinc powder according to the present invention is preferably spherical. Since the spherical powder has a smoother surface than irregular shaped powder, it is easier to control the color development in the former powder than in the latter. It is thus easy to develop various colors on the spherical powder.

The colored zinc powder according to the present invention exhibits both the rust-proofing effect and the coloring effect of pigment in paint. The colored zinc powder according to the present invention is easily applied to parts having complicated shape and provides uniform color without shading.

The colored zinc powder according to the present invention can be applied such materials as steel, aluminum and ceramics.

The colored zinc powder according to the present invention can be used as pigment in paint.

The method for producing the colored zinc powder according to the present invention is described hereinafter.

The zinc alloy with the additive element(s) are crushed to yield the uncolored powder. In the case of crusing method, a large amount of additive element(s) ranging from 0.5-10% by weight is preferably added to the zinc to embrittle it. The so crushed powder is then heated to a temperature of from 350° to 700° C. This temperature is occasionally higher than the melting point of the zinc alloy. But the zinc alloy does not melt down because its surface is slightly oxidized during heating. As a result of oxidizing, the uncolored powder is converted to the colored powder which develops fresh color on the surface thereof. The oxidizing time is usually from 3 seconds to 100 minutes. A different color develops depending upon the length of the oxidizing time. For example, in the case of the addition of titanium, the color development varies successively with the prolongation of the oxidizing time, so that brown, navy blue, blue, greenish-brown appear successively. That is, the identical cycle of color change is repeated. In the case of the addition of vanadium, one cycle of color change is the successive appearance of yellow, green, and dark blue. In the case of the addition of manganese, one cycle of color change is the successive appearance of yellow, yellow-green, greenish-brown, green, and coffee brown.

In order to obtain a fresher color, it is preferable that the uncolored powder be held in an atmosphere of inert gas, for example Ar gas, or neutral gas, for example $N_2$ gas, which contains from 0.003 to 1% of oxygen, until the temperature is elevated to a holding temperature in the range of from 350° to 700° C. The inert or neutral atmosphere containing less than 1% of oxygen can prevent the powder surface from excess oxidation of zinc during the temperature elevation, thereby aiding color development. The subsequent oxidation by the oxygen-containing gas with the oxygen content of 0.003-1% after heating in the inert or neutral atmosphere is desirable for preferential oxidation of the additive element(s) and hence for fresh color development.

According to another method for producing colored zinc powder according to the present invention, zinc alloy containing the additive elements is melted and then atomized in an atmosphere of oxygen-containing gas or inert gas so as to provide the zinc-alloy powder. This powder is then subjected to oxidation in a fluidized bed at a temperature of from 350° to 700° C. for a certain time period to obtain a specific color.

For the atomizing method in oxygen-containing gas, it is preferable that an atomizing apparatus be connected with an apparatus for creating a fluidized bed, thereby enabling continuous oxidation of the zinc-alloy powder. The zinc-alloy powder is difficult to spheroidize by atomizing in the oxygen-containing gas. It is preferred that the atomizing be carried out in inert or neutral gas with oxygen content of from 0 to 5% and, further, the oxidation be carried out in an apparatus separate from the atomizing apparatus.

In accordance with the present invention, the colored zinc powder is sprayed on an article by the conventional thermal spraying method for Zn powder. It is possible to color various articles and to improve the corrosion resistance of the articles.

It is also possible to bond the colored zinc powder onto materials having an adhesive surface. The so-colored plate can be used as a decorative panel. The surface of the colored plate may become rough due to application of the colored zinc powder. It is therefore preferable that a transparent organic agent be applied on the surface colored by the colored zinc powder.

Figure 1:
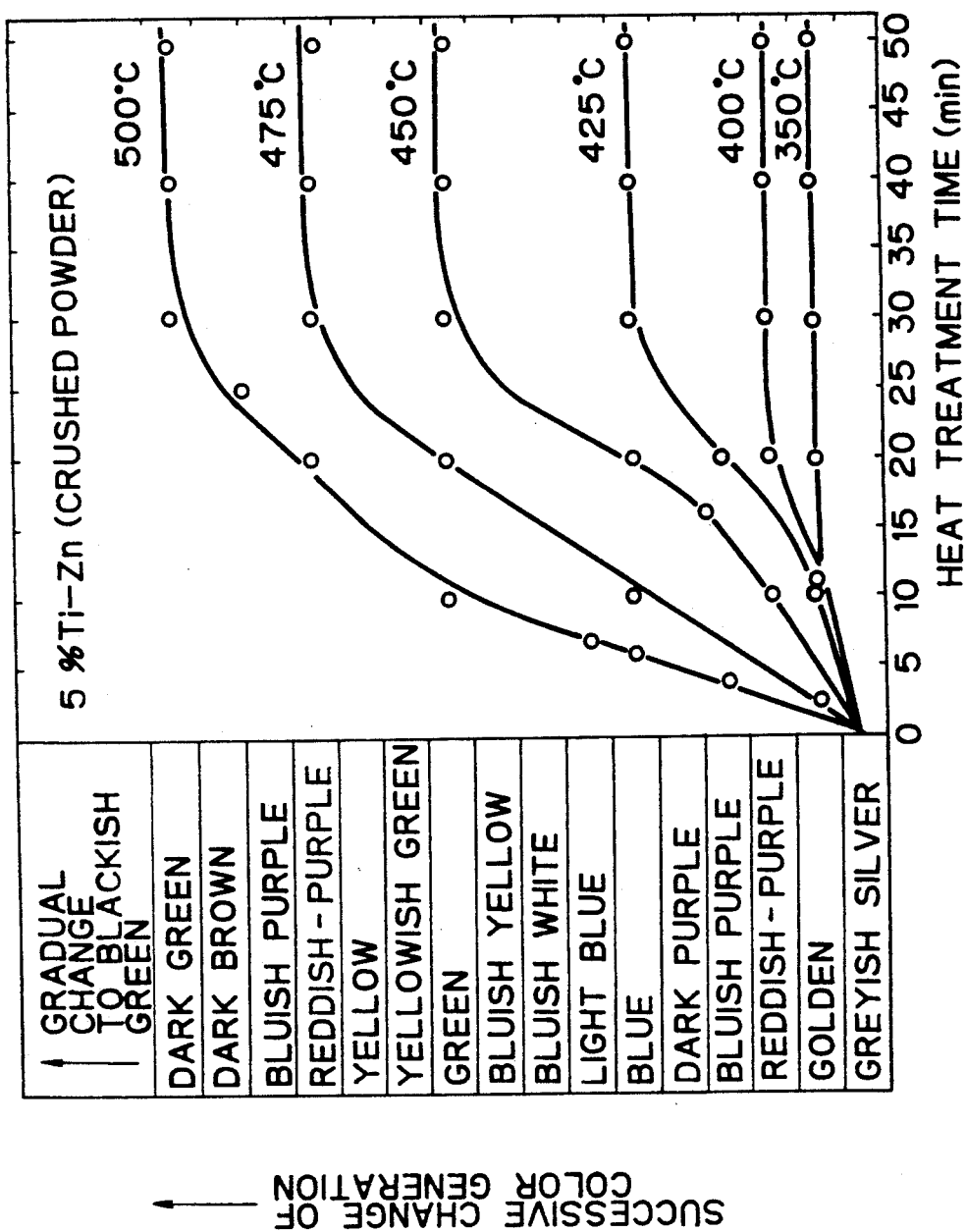
FIG. 1 is a graph showing the successive change of color generation of 5% Ti-Zn crushed powder.

The present invention is described hereinafter with reference to the examples.

EXAMPLE 1

Ti was added to the distilled zinc metal (98.5wt. %). the so-obtained Zn alloy contained 5 wt % of Ti and had a melting point of 620° C. The alloy was crushed and then sieved to prepare the powder having a size of 50 μm or less. The powder was heated in an Ar atmosphere up to 550° C. When the temperature was elevated to 550° C., and Ar atmosphere containing 0.05% of oxygen was replaced with air. The oxidation was then carried out at 550 C.

The powder was gray before heating. After oxidation for 30 seconds the powder was converted to yellowish-brown. The color changes as follows: after 1.5 minutes—dark brown, after 2 minutes—navy blue, after 3 minutes—light blue, after 4.5 minutes—greenish-brown, and after 14 minutes—brown. The colors mentioned above were obtained by holding the powder at 550° C. for the respective time, followed by cooling.

EXAMPLE 2

The same procedure using the same powder as in Example 1 was carried out at an oxidation temperature of 500° C. The color development and color change occurred more slowly as compared with Example 1. It was therefore easier in Example 2 to obtain one of the desired colors described in Example 1.

EXAMPLE 3

The 5% Ti-Zn crushed powder of Example 1 was heat-treated at a temperature of from 350° to 500° C. The successive change of color generation is shown in FIG. 1. As shown in this figure, golden color, reddish-purple, blue, and green are obtained by heat treatment at 350°, 400°, 425°, and 450° C., respectively. It turned out, therefore, that the desired color could be obtained by heat treatment at a temperature of 450° C. or lower.

In addition, it turned out that the speed of color change in the present example was slower than in Example 1; and, further, control of thickness of the oxide layer was easier in the present example than in Example 1.

EXAMPLE 4

Ti was added to the distilled zinc metal (98.5 wt %). The so obtained zinc-alloy contained 0.25 wt % of Ti and had a melting point of 450° C. The zinc alloy was melted at 550° C. and then atomized by $N_2$ gas in a neutral atmosphere. The chamber of the atomizing apparatus contained traces of oxygen (3 vol %), the balance being $N_2$. The zinc powder obtained by atomizing was spherical. The zinc powder was heated to 550° C. and fluidized in an apparatus which was provided with a means for creating the fluidized bed. The color development at respective oxidizing times was as follows: light yellow at 30 seconds; orange at 1.5 minutes; reddish-purple at 2.0 minutes; bluish-purple at 3.0 minutes; blue at 4.5 minutes; light green at 6 minutes; and dark green at 14 minutes.

EXAMPLE 5

Figure 2:
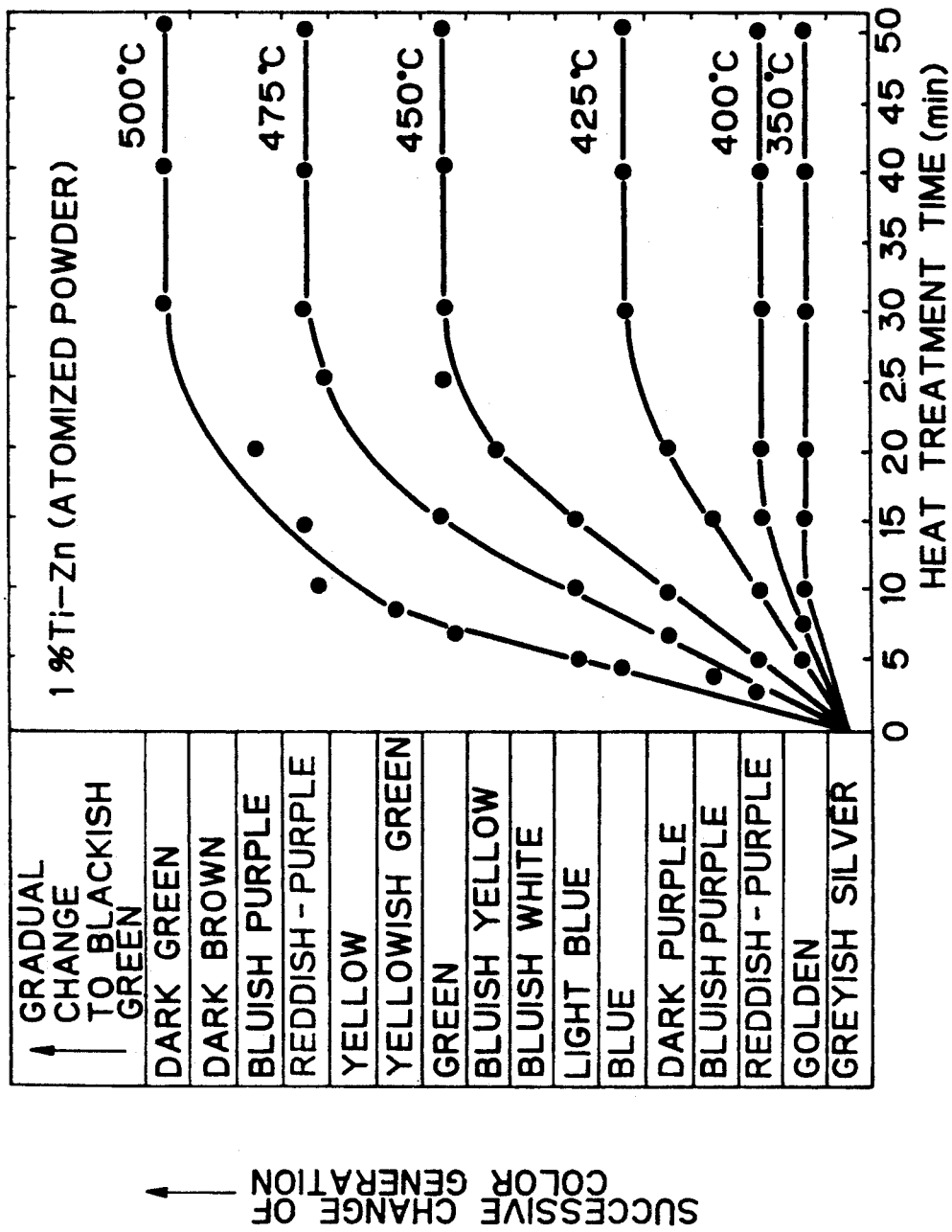
FIG. 2 is a graph showing the successive change of color generation of 1% Ti-Zn atomized powder.

The 1% Ti-Zn atomized powder of Example 4 was heat-treated at a temperature of from 350° to 500° C. The successive change of color generation is shown in FIG. 2. As shown in this figure, golden color, reddish-purple, blue, and green are obtained by the heat treatment at 350°, 400°, 425°, and 450° C., respectively. It turned out, therefore, that the desired color could be obtained by heat treatment at a temperature of 450° C. or lower.

In addition, it turned out that the speed of color change in the present example was slower than in Example 4; and, further, control of thickness of the oxide layer was easier in the present example than in Example 4.

EXAMPLE 6

The brown zinc-alloy powder obtained in Example 1 (Ti content—5 wt %) was sprayed on a flat steel plate.

The spraying condition was as follows.

A spraying gun—METCO 6P—II
Flame gas—acetylene (15 psi)+oxygen (30 psi)
Spraying air—nitrogen (55 psi)
Pinch air—air (50 psi)
Spraying distance—200 mm A plate having brown appearance was obtained.

The spraying on curved steel sheets was also carried out using the Zn-5 wt % Ti, brown powder. A uniform brown appearance was obtained.

EXAMPLE 7

Greenish-brown zinc powder (Ti content—5%) having a particle diameter of approximately 50 $\mu$m was uniformly applied on a steel substrate having an adhesive surface. The adhesive surface was provided by applying silicone binder (Shin-etsu Silicone, product of Shin-etsu Chemical Co., Ltd.) on the steel substrate. The surface of the steel sheet, on which the greenish-brown powder was applied, was somewhat rough. Transparent urethane resin (high Urethane, product of Nihon Yushi Co., Ltd.) was applied on the colored surface. As a result, a decorative panel having a lustrous appearance was obtained.

EXAMPLE 8

Navy blue zinc powder (Ti content—5 %) obtained in Example 1 and having average particle size of 50 $\mu$m was mixed with urethane resin (the same product as used in Example 5). The proportion of the zinc powder was 100 parts by weight to 100 parts by weight of the urethane resin. The paint prepared by mixing as described above was applied on a steel sheet to a thickness of 40 $\mu$m and was then subjected to natural drying. As a result, a navy blue appearance was obtained.

EXAMPLE 9

Zn alloy containing 5 wt % of Mn was crushed and then sieved to prepare a powder 100–200 mesh in size. The so prepared powder was heated as in Example 1. Coffee brown color developed by heating at 550° C. for 30 minutes. Slightly greenish-brown color developed by heating at 500° C. for 30 minutes.

Heating in air was also carried out at 450° C. for 30 minutes. The greenish-brown color then developed.

We claim:

1. A colored zinc powder comprising particles of zinc containing a coloring element and having a surface layer of colored oxide thereon formed by oxidizing the surface of said particles at a temperature of from 350° to 700° C. of 3 seconds to 100 minutes without melting the particles.

2. A colored zinc powder according to claim 1, wherein the zinc contains 0.01 to 10% by weight of the coloring element and at least one coloring element selected from the group consisting of Ti, Mn, and V.

3. A colored zinc powder according to claim 2, wherein the zinc contains 1.5% by weight or less of Pb, Cd and Fe, and 88.5% by weight or more of Zn.

4. A method for producing a colored zinc powder which comprises preparing particles of zinc containing a coloring element and oxidizing the surface of the particles at 350° to 700° for 3 seconds to 100 minutes without melting the particles.

5. A method according to claim 4 wherein the particles to be oxidized are heated to 350° to 700° C. in an inert or neutral atmosphere containing from 0.003 to 1% by volume of oxygen.

6. A method according to claim 4, wherein the zinc contains 0.001 to 10% by weight of the coloring element and at least one coloring element selected from the group consisting of Ti, Mn, and V.

7. A method according to claim 6, wherein the balance of the coloring element is 1.5% by weight or less of Pb, Cd and Fe, and 88.5% by weight or more of Zn.

8. A method according to claim 4, wherein the particles are prepared by atomizing a zinc melt which contains the coloring element.

9. A method according to claim 4, wherein the atomizing is carried out in an inert or neutral atmosphere having an oxygen content of 5% by volume or less.

10. A method according to claim 9, wherein the particles are fluidized and oxidation is carried out in a fluidized bed.

11. A method according to claim 4, wherein the particles are prepared by crushing zinc which contains the coloring element.

12. A pigment consisting of the colored zinc powder prepared by the method of claim 4.

13. A method for producing a colored article which comprises spraying a substrate with the pigment of claim 12.

14. A method according to claim 13, wherein the substrate has an adhesive surface.

15. A colored zinc powder according to claim 2, wherein the coloring element is Ti and the color is golden, reddish-purple, bluish purple, dark-purple, blue, light blue, bluish white, bluish yellow, green yellowish green, yellow, reddish-purple, bluish purple, dark brown, or dark green.

16. A colored zinc powder according to claim 15, wherein the oxidizing is carried out for a period of at least about 20 minutes.

17. A pigment consisting of the particles of any one of claim 1, 2, 4, 15 or 16.

* * * * *